US008301746B2

(12) United States Patent
Head et al.

(10) Patent No.: US 8,301,746 B2
(45) Date of Patent: Oct. 30, 2012

(54) METHOD AND SYSTEM FOR ABSTRACTING NON-FUNCTIONAL REQUIREMENTS BASED DEPLOYMENT OF VIRTUAL MACHINES

(75) Inventors: Michael R. Head, Vestal, NY (US); Andrzej Kochut, Hawthorne, NY (US); Charles O. Schulz, Hawthorne, NY (US); Hidayatullah H. Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/693,922

(22) Filed: Jan. 26, 2010

(65) Prior Publication Data
US 2011/0185063 A1 Jul. 28, 2011

(51) Int. Cl.
*G06F 15/173* (2006.01)
(52) U.S. Cl. ........ 709/223; 709/203; 709/217; 709/224; 718/1; 718/104
(58) Field of Classification Search .................. 709/203, 709/223, 224, 217; 718/1, 104
See application file for complete search history.

(56) References Cited

U.S. PATENT DOCUMENTS

| 7,743,375 | B2 * | 6/2010 | Goodman et al. ................. 718/1 |
| 8,171,201 | B1 * | 5/2012 | Edwards, Sr. ..................... 711/6 |
| 2007/0192329 | A1 | 8/2007 | Croft et al. |
| 2007/0198656 | A1 | 8/2007 | Mazzaferri et al. |
| 2008/0034365 | A1 | 2/2008 | Dahlstedt |
| 2009/0210888 | A1 * | 8/2009 | Lee et al. ....................... 719/321 |
| 2009/0276772 | A1 | 11/2009 | Garrett et al. |
| 2009/0276776 | A1 * | 11/2009 | Dube et al. ..................... 718/100 |
| 2010/0054763 | A1 * | 3/2010 | Tomiyori et al. ............... 399/12 |
| 2010/0169948 | A1 * | 7/2010 | Budko et al. ...................... 726/1 |
| 2010/0211946 | A1 * | 8/2010 | Elzur ................................ 718/1 |
| 2011/0023029 | A1 * | 1/2011 | Diab et al. ........................ 718/1 |
| 2011/0041126 | A1 * | 2/2011 | Levy et al. ........................ 718/1 |
| 2011/0055377 | A1 * | 3/2011 | Dehaan ......................... 709/224 |
| 2011/0078680 | A1 * | 3/2011 | Lagergren et al. ............... 718/1 |
| 2011/0185064 | A1 * | 7/2011 | Head et al. .................... 709/226 |
| 2011/0252137 | A1 * | 10/2011 | Stienhans et al. ............. 709/224 |

OTHER PUBLICATIONS

International Search Report and Written Opinion for corresponding International Patent Application No. PCT/US11/22564. Dated: Mar. 29, 2011. (13 Pages).
Barham, et al. "Xen 2002," University of Cambridge, Computer Laboratory, Tech. Rep. No. 553. Jan. 2003. Pages 1-15. http://www.cl.cam.ac.uk/TechReports/UCAM-CL-TR-553.pdf.
Barham, et al. "Xen and The Art of Virtualization," in Proceedings of OSDI, Oct. 2003. (14 Pages).
Bobroff, et al. "Dynamic Placement of Virtual Machines for Managing SLA Violations," 10th IFIP/IEEE International Symposium on Integrated Network Management, 2007. IM '07., May 2007.

(Continued)

*Primary Examiner* — Lashonda Jacobs
(74) *Attorney, Agent, or Firm* — Tutunjian & Bitetto, P.C.; Louis Percello

(57) ABSTRACT

A system and method for allocating resources in a cloud environment includes providing an abstraction layer between a cloud environment and one or more data centers by generating a virtual hypervisor as an application programming interface. Responsive to a workload request by the one or more data centers, resources are partitioned and virtual machines are instantiated in the one or more data centers using the virtual hypervisor such that non-functional requirements of the workload are addressed at the abstraction level using the virtual hypervisor.

20 Claims, 3 Drawing Sheets

OTHER PUBLICATIONS

Clark, et al. "Live Migration of Virtual Machines," in Proceedings of the Symposium on Networked Systems Design and Implementation, May 2005. (14 Pages).

Creasy, "The Origin of the VM/370 Time-Sharing System," IBM Journal of Research and Development, vol. 25, No. 5. Sep. 1981. pp. 483-490.

Gum, "System/370 Extended Architecture: Facilities for Virtual Machines," IBM Journal of Research and Development, vol. 27, No. 6. Nov. 1983.

IBM, "Advanced Power Virtualization on IBM System P5," Fourth Edition. May 2008. (400 Pages) http://www.redbooks.ibm.com/abstracts/sg247940.html.

Kimbrel, et al. "Dynamic Application Placement Under Service and Memory Constraints," in Proceedings of International Workshop on Efficient and Experimental Algorithms, Apr. 2005. pp. 1-10.

Kimbrel, et al. "Minimizing Migrations in Fair Multiprocessor Scheduling of Persistent Tasks," in Proceedings of ACMSIAM Symp. on Discrete Algorithms, Jul. 2004.

Kochut, "On Impact of Dynamic Virtual Machine Reallocation on Data Center Efficiency," in Proceedings of the IEEE Mascots. IEEE International Symposium on Modeling, Analysis and Simulation of Computers and Telecommunication Systems, 2008. Mascots 2008. Sep. 2008.

Kochut, et al. "On Strategies for Dynamic Resource Management in Virtualized Server Environments," in Proceedings of the IEEE Mascots. 15th International Symposium on Modeling, Analysis, and Simulation of Computer and Telecommunication Systems. Oct. 2007.

Rolia, et al. "Statistical Service Assurances for Applications in Utility Grid Environments," Performance Evaluation Journal, vol. 58, 2004. (10 Pages).

Shen, et al. "Integrated Resource Management for Cluster-Based Internet Services," in Proceedings of the OSDI, 2002. (14 Pages).

Sugerman, et al. "Virtualizing I/O Devices on VMware Workstation's Hosted Virtual Machine Monitor," Proceedings of the 2001 USENIX Annual Technical Conference, Jun. 2001. (15 Pages).

Waldspurger, "Memory Resource Management in VMware ESX Server," In Proc. Fifth Symposium on Operating Systems Design and Implementation (OSDI '02), Dec. 2002. pp. 1-14.

* cited by examiner

METHOD AND SYSTEM FOR ABSTRACTING NON-FUNCTIONAL REQUIREMENTS BASED DEPLOYMENT OF VIRTUAL MACHINES

BACKGROUND

1. Technical Field

The present invention relates to computer networks and more particularly to system and methods for resource allocation in cloud environments.

2. Description of the Related Art

Virtualization has rapidly gained popularity, which affects multiple levels of computing stacks. Since virtualization decouples resources from their users, it provides greater flexibility in terms of resource allocation but also brings in new challenges for optimal design, provisioning and runtime management of systems. Cloud computing is a paradigm of computing that offers virtualized resources "as a service" over the internet. Cloud Managers are responsible for lifecycle management of virtual resources, efficient utilization of physical resources, and they expose basic application programming interfaces (APIs) for operations to users. Software solutions can then be deployed on these virtual resources.

Virtualization, which decouples physical resources from their users, has emerged as one of the key drivers of data center innovation and optimization. Operating system virtualization was first proposed by IBM in the 1960's. Recently, with increased computing capacity of the low-end machines, similar capabilities are now available for many platforms. A virtualized server runs a thin software or firmware layer called a hypervisor which presents an abstraction of the underlying hardware to host multiple virtual machines (VMs). VMs execute either an unmodified (in case of full virtualization) or a slightly modified (in case of para-virtualization) version of the operating system. Virtualization increases server utilization and therefore increases data center efficiency by combining several workloads on a single server.

Referring to FIG. 1, a "hybrid" cloud VM deployment scenario is illustratively shown where a customer "A" data center requests to place three workloads: 1) "Workload1" contains a server workload with a critical business application that has to be highly available within a data center and recoverable in another data center in case of a disaster; 2) "Workload2" is a Virtual Desktop assigned to a user with lower security restrictions but highly sensitive to latency; and 3) "Workload3" is a Virtual Desktop assigned to a user with higher security requirements. Deployment of a virtual machine (VM) typically involves the following steps indicated in the diagram: Step 1. A Cloud Manager 10 requests a Resource Pool Manager 12, in an appropriate data center 14, for an available hypervisor 16 with enough capacity. Step 2. Cloud Manager 10 calls the hypervisor 16 (using standard APIs like libVirt or VMWare SDK) to deploy a VM from a template/appliance. Step 3. The hypervisor creates a VM (VM1).

Deployment of Workload1 requires provisioning three Virtual Machines—VM1 is the primary;—VM1' is a backup for High Availability;—VM1" is a backup in another datacenter (data center 2) 15. Deployment of Workload2 requires one Virtual Machine, VM2, to be created in a Service Provider (SP) Data Center (data center 2) 15 located physically close to the user (customer A) for reduced latency. Deployment of Workload3 requires one Virtual Machine, VM3, to be created in a Customer Data Center 17 for improved security. Based on the type of workload and non-functional requirements (NFR), the calls from the cloud manager 10 could get complex and could be different each time.

SUMMARY

A system and method for allocating resources in a cloud environment includes providing an abstraction layer between a cloud environment and one or more data centers by generating virtual hypervisor as an application programming interface. Responsive to a workload request by the one or more data centers, resources are partitioned and virtual machines are instantiated in the one or more data centers using the virtual hypervisor such that non-functional requirements of the workload are addressed at the abstraction level using the virtual hypervisor.

A system for allocating resources in a cloud environment includes a cloud network managed by a cloud manager and configured to satisfy workload requests from at least one data center, the at least one data center including a resource manager configured to manage virtual machines. At least one virtual hypervisor is configured to provide an interface between the cloud manager and the at least one data center. The at least one virtual hypervisor is configured to address non-functional requirements of the workload at an abstraction level to reduce complexity of interactions between the cloud manager and the at least one data center.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
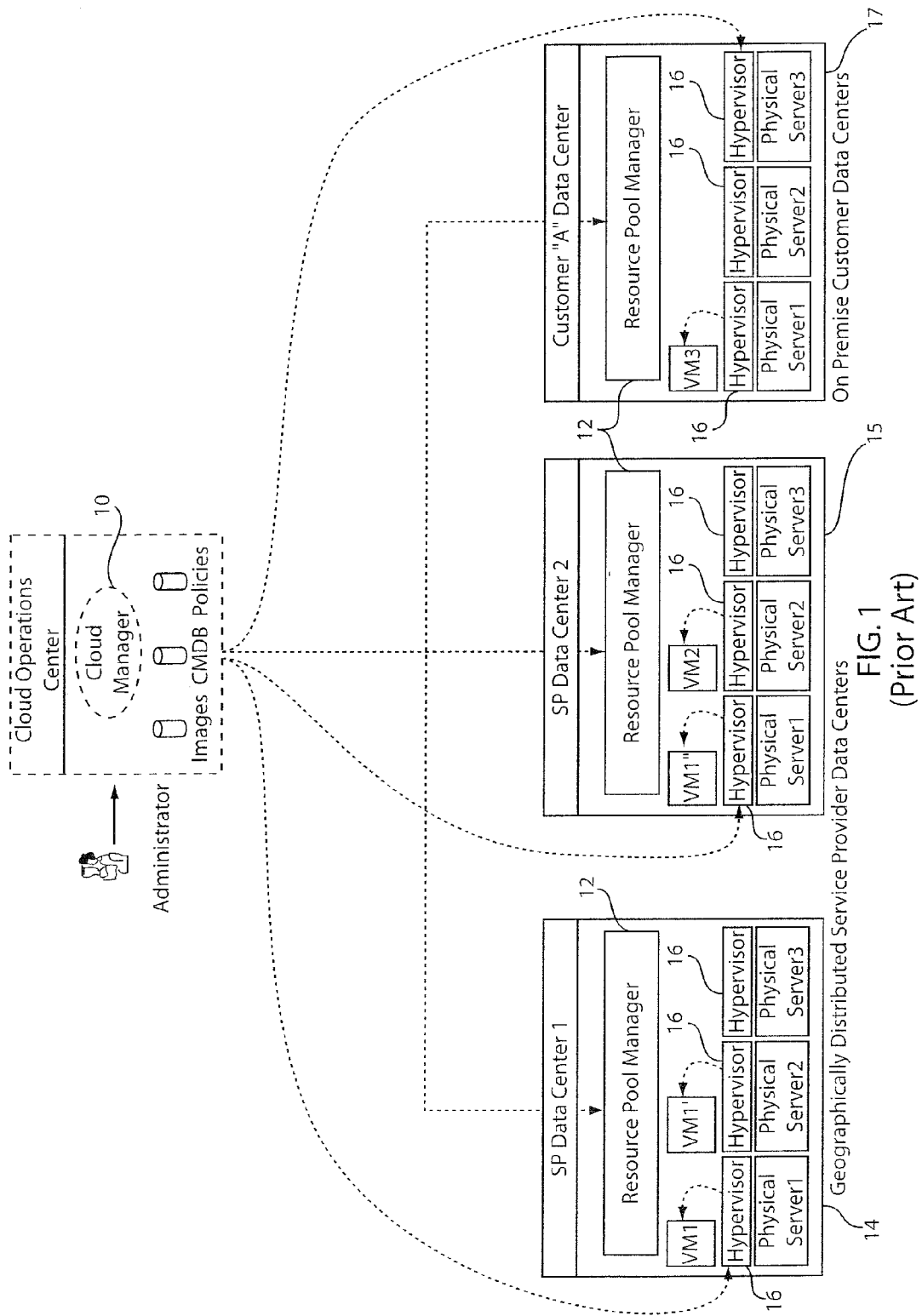
FIG. 1 is a block diagram showing a conventional cloud network where virtual machines are created at a data center.

In accordance with the present principles, a Virtual Hypervisor abstraction is provided which permits customers to have improved control over resource allocation decisions regarding their virtual machines while a cloud manager maintains its role as the ultimate physical resource manager. In addition, methods are provided for resource allocation illustrating how the Virtual Hypervisor abstraction can be efficiently realized by a global cloud manager. The present concepts can be used to achieve fairer resource sharing and isolation across different Virtual Hypervisors.

In accordance with particularly useful embodiments, the cloud model is enhanced to provide better control over the resource allocation decisions regarding virtual machines (VMs). A partition of the management of the cloud physical infrastructure is maintained from the management of the solutions hosted on the cloud. With this partitioning in accordance with customers, resource pool managers can concentrate on optimizing their environments, and cloud management can focus on making the most efficient use of the physical resources and making sure that Service Level Agreements (SLAs) with its customers are fulfilled.

To achieve this separation, a Virtual Hypervisor (VH) is introduced and provides an abstraction permitting a solution to decide how the underlying resources should be shared and how the resource contention should be resolved. The cloud manager can map virtual machines to physical servers in the most optimal fashion (from its point of view) as long as it meets the constraints defined by the Virtual Hypervisor.

The cloud manager requests virtual hypervisors from the cloud instead of from specific VMs. It then uses these virtual hypervisors just as it would use actual hypervisors on the physical hosts interfacing with them using an application programming interface (API) similar to that used with actual physical servers and a virtualization or resource pool manager. These virtual hypervisors are not real entities. They are simply abstract groupings of resources which are managed by the cloud with respect to a single service level agreement, customer request or other event between the cloud/cloud manager and data centers. The actual mapping of the virtual hypervisor onto physical servers is the responsibility of the cloud manager, and the deployment and management of VMs on top of the virtual hypervisors is handled in a virtualized infrastructure of the data centers, e.g., by hypervisers associated with physical servers.

In a virtual desktop, a solution manager of, e.g., a customer, first requests some number of virtual hypervisors providing specific requirements, such as geography where they should execute (or network distance from a given location, which affects the remote desktop experience), capacity that should be available, as well as other parameters, such as network bandwidth between VMs created within this virtual hypervisor, and storage requirements. Subsequent to this, the solution manager creates virtual machines within the virtual hypervisors and assigns capacity limits, resource usage shares, and other properties similarly to virtualization models. During system operation, the solution manager can adjust the shares of its virtual machines within the virtual hypervisor, or migrate VMs from one virtual hypervisor to another. Those actions have an explicit effect on resource allocation and user experience. For example, if a desktop solution manager knows that certain desktops are performing less important work, it can migrate a larger number of them to a single virtual hypervisor while moving more important VMs to a less congested virtual hypervisor. Note that this migration does not necessarily result in actual VM migration at the infrastructure level. It is up to cloud manager to decide how to realize the isolation and resource allocation specified by virtual hypervisors. Similar expressiveness could be achieved by complex language on a set of VMs in the cloud model.

A Virtual Hypervisor abstraction permits solution managers, or resource pool managers to have improved control over the resource allocation decisions regarding their virtual machines while maintaining a cloud manager's role as the ultimate physical resource manager. Resource allocation methods illustrate how the virtual hypervisor abstraction can be efficiently realized by the global cloud manager. The present solutions introduce the virtual hypervisor to abstract hypervisors that could be on different physical servers, geographically distributed, on different networks (service provider, customer). This virtual hypervisor simplifies the deployment of cloud solutions As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
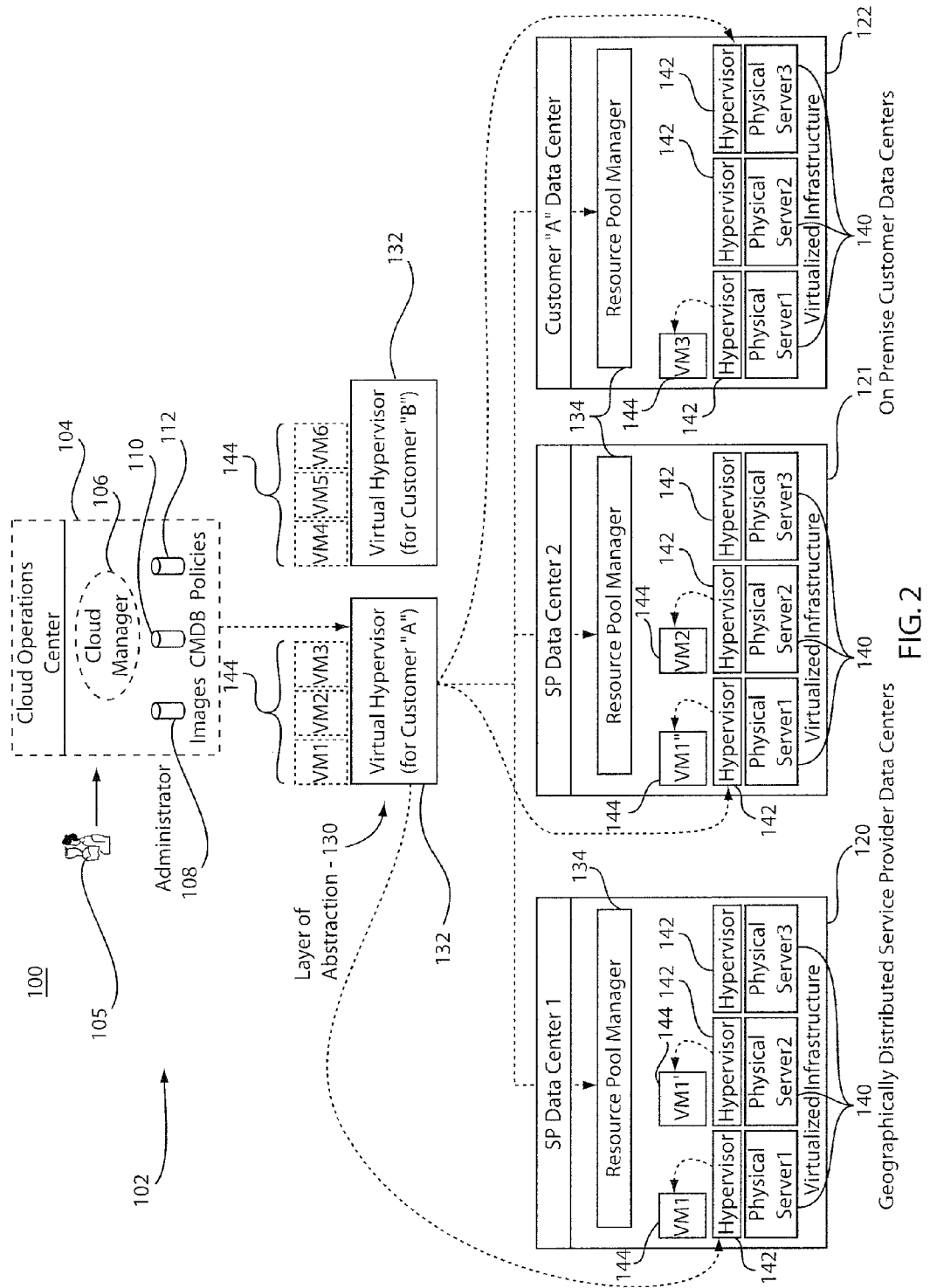
FIG. 2 is a block diagram showing a cloud network interfacing with an abstraction level having a virtual hypervisor in accordance with one illustrative embodiment.

Referring now to the drawings in which like numerals represent the same or similar elements and initially to FIG. 2, an illustrative block diagram shows a system 100, which includes a cloud network 102 in accordance with one embodiment. The cloud network 102 includes a cloud operations center 104, which includes hardware and software components for providing cloud services to customers. In one illustrative application, the cloud network 102 may provide virtual desktop services to customers. The cloud network 102 may include an image database 108, a configuration management database (CMDB) 110 and a policy database 112. The image database 108 may store snapshots of the network to provide a way for restoration of portions of the network in the event of a problem or failure. The CMDB 110 supports all cloud manager functions, and policies 112 are employed by a cloud manager 106 in managing the cloud network and its interfaces.

The cloud network 102 includes the cloud manager 106 and is maintained by an administrator 105. The cloud manager 106 is configured to allocate resources among a plurality of users, customers, nodes, etc. In one illustrative embodiment, interactions between the cloud manager 106 and virtualized resources in a data center 120, 121 and 122 can be simplified by inserting an abstraction layer 130 in between.

Data centers 120, 121 and 122 may be geographically distributed service provider data centers or on-premises customer data centers.

Data centers 120, 121 and 122 each include an associated resource pool manager 134 configured to manage resources internally in its respective data center. Physical servers 140 in each data center (120, 121, 122) include a hypervisor 142.

Manager 134 deploys virtual machines (VMs) 144 and manages them based on problem space specific knowledge and runtime information including current workload, calendar, wall clock time, historical workload models, etc. To perform these management functions, the manager 134 interacts with the hypervisor 142 on individual servers 140 or with a central virtualization infrastructure manager or pool resource manager 134. The virtualization manager 134 monitors resource usage on each of the servers 140 (and by each of the VMs 144) as well as to make configuration changes such as adding, removing, starting, stopping VMs 144. Manager 134 can also control the placement of VMs 144 on physical servers 140 and the relative shares of resources that are allocated to each of the VMs 144 during the periods of contention. The manager 134 manipulates these controls to optimize performance and resource utilization.

The abstraction layer 130 includes or provides a virtual hypervisor or hypervisors 132. The virtual hypervisor 132 provides an application programming interface (API) similar to a real hypervisor (e.g., which may be similar to libVirt, VMWare SDK, which are known in the art). Virtual hypervisors 132 are employed on the physical hosts interfacing with them using an API similar to that used with actual physical servers 140 and virtualization managers, e.g., 134. These virtual hypervisors 132 are not real entities. They are simply abstract groupings of resources which are managed by the cloud manager 106, e.g., with respect to a service level agreement between the cloud manager 106 and the manager 134 or managers 134 of data centers 120, 121, and/or 122. The actual mapping of the virtual hypervisor 132 onto physical servers (e.g., servers 140) is the responsibility of the cloud manager 106, and the deployment and management of VMs 144 on top of the virtual hypervisors 132 is handled by the pool resource manager 134.

Advantageously, a call from the cloud manager 106 to the virtual hypervisor no longer depends on non-functional requirements (NFRs) of a workload. The NFRs are one of the inputs to the calls to the virtual hypervisor 132. The virtual hypervisor 132 acts as a proxy and hides the complexity associated with virtual machine or resource assignments. The virtual hypervisor 132 handles contacting the resource pool manager 134 in the appropriate data center (120, 121, 122), contacting the hypervisors 142 of physical servers 140 and instantiating the VMs 144.

A non-functional requirement is a requirement that specifies criteria that can be used to judge the operation of a system, rather than specific behaviors. Non-functional requirements define how a system is supposed to be, and non-functional requirements are often called qualities of a system. Non-functional requirements include constraints, quality attributes, quality goals and quality of service requirements, etc. In particularly useful embodiments, NFRs may include disaster recovery criteria, latency criteria, security criteria and other system qualities. Non-functional requirements can be divided into two main categories: 1. Execution qualities, such as security and usability, which are observable at run time. 2. Evolution qualities, such as testability, maintainability, extensibility and scalability, which are embodied in the static structure of the software system. Sufficient network bandwidth may be a non-functional requirement of a system.

Workload NFRs may include, e.g., accessibility, service level agreement criteria, resource constraints (processor speed, memory, disk space, network bandwidth, etc.), online response times, timing of the company offices, security, backup, etc. The NFRs add a level of difficulty in responding to workload requests made of the cloud manager 106. In accordance with one aspect of the present principles, the virtual hypervisor 132 can instantiate VMs and partition resources among data centers or other entities at the abstraction level 130 to provide ease of compliance with the NFRs. The NFRs may be provided to the virtual hypervisor 132 as an input and once an assessment of the network conditions are determined, NFRs can be addressed. This significantly reduces complexity in addressing NFRs.

The virtual hypervisor 132 permits multi-VM deployment, e.g., in High Availability Disaster Recovery (HADR) scenarios. In one example, a single create command from the cloud manager 106 to the virtual hypervisor can result in a plurality of VMs being instantiated. Using the example from above, three VMs may be created with a single command. For example, VM1, VM1' and VM1" are created on different physical servers 140 in different data centers (120, 121). The virtual hypervisor 132 permits handling of a heterogeneous operation set associated with different types of hypervisors (e.g., hypervisors 142). The virtual hypervisor 132 provides features and functionality to permit a more fair and efficient distribution of resources and provide users/service providers with greater flexibility and reduced complexity.

Figure 3:
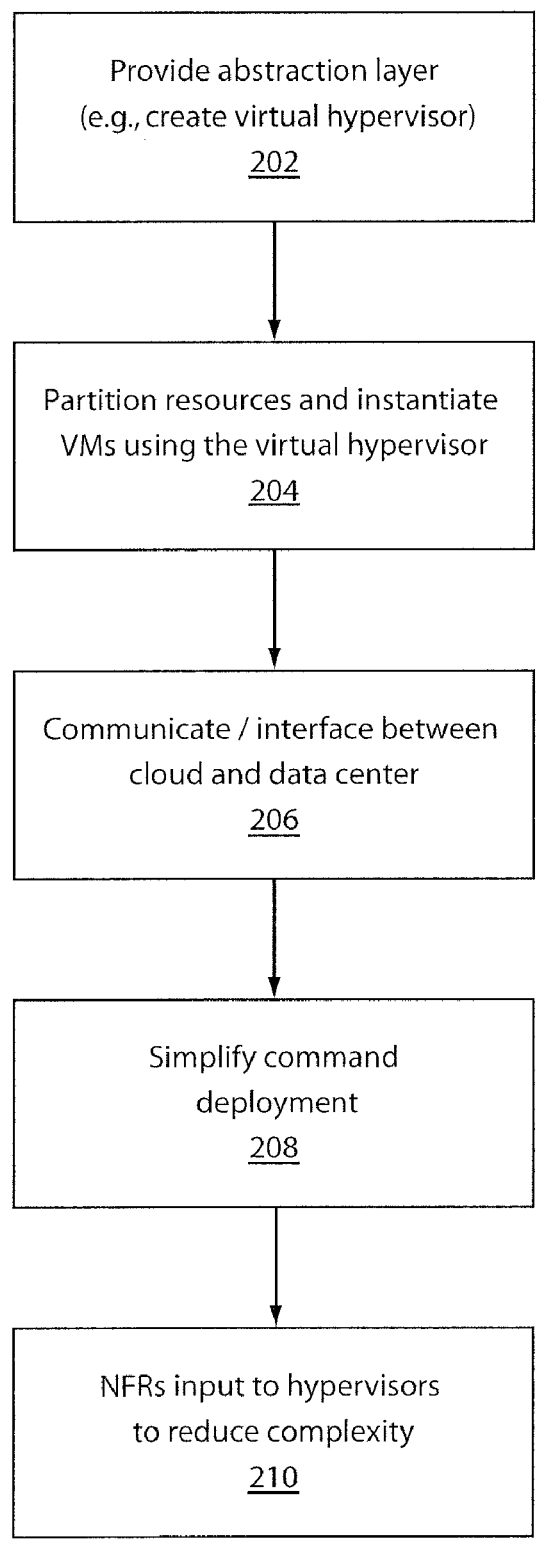
FIG. 3 is a block/flow diagram showing a system/method for allocating resources in accordance with one illustrative embodiment.

Referring to FIG. 3, a system/method for allocating resources in a cloud environment is illustratively depicted. In block 202, an abstraction layer is provided or generated between a cloud environment and one or more data centers by generating a virtual hypervisor as an application programming interface. In block 204, responsive to a workload request by the one or more data centers, partitioning resources and instantiating virtual machines are performed in the one or more data centers using the virtual hypervisor such that non-functional requirements of the workload are addressed at the abstraction level using the virtual hypervisor.

In block 206, communicating between the cloud environment and the one or more data centers is provided through the virtual hypervisor. This may include, e.g., contacting a resource pool manager of a data center, contacting a hypervisor associated with a physical server of a data center, etc. In block 208, simplified commands may be deployed. For example, a single create command is deployed at the virtual hypervisor to create a plurality of virtual machines at different servers. The different servers may be located at different data centers. In block 210, non-functional requirements are input to the virtual hypervisor to address the non-functional requirements at the abstraction level.

Having described preferred embodiments of a system and method for abstracting non-functional requirements based deployment of virtual machines (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for allocating resources in a cloud environment, comprising:

providing an abstraction layer between a cloud environment and one or more data centers by generating a virtual hypervisor stored on a computer readable storage medium as an application programming interface; and responsive to a workload request by the one or more data centers, partitioning resources and instantiating virtual machines in the one or more data centers using the virtual hypervisor such that non-functional requirements of the workload are addressed at the abstraction level using the virtual hypervisor.

2. The method as recited in claim 1, further comprising communicating between the cloud environment and the one or more data centers through the virtual hypervisor.

3. The method as recited in claim 2, wherein communicating includes contacting a resource pool manager of a data center.

4. The method as recited in claim 2, wherein communicating includes contacting a hypervisor associated with a physical server of a data center.

5. The method as recited in claim 1, further comprising deploying a single create command at the virtual hypervisor to create a plurality of virtual machines at different servers.

6. The method as recited in claim 5, wherein the different servers are located at different data centers.

7. The method as recited in claim 1, further comprising inputting the non-functional requirements as an input to the virtual hypervisor to address the non-functional requirements at the abstraction level.

8. A computer readable storage medium comprising a computer readable program for allocating resources in a cloud environment, wherein the computer readable program when executed on a computer causes the computer to perform the steps of:

providing an abstraction layer between a cloud environment and one or more data centers by generating a virtual hypervisor as an application programming interface; and responsive to a workload request by the one or more data centers, partitioning resources and instantiating virtual machines in the one or more data centers using the virtual hypervisor such that non-functional requirements of the workload are addressed at the abstraction level using the virtual hypervisor.

9. The computer readable storage medium as recited in claim 8, further comprising communicating between the cloud environment and the one or more data centers through the virtual hypervisor.

10. The computer readable storage medium as recited in claim 9, wherein communicating includes contacting a resource pool manager of a data center.

11. The computer readable storage medium as recited in claim 9, wherein communicating includes contacting a hypervisor associated with a physical server of a data center.

12. The computer readable storage medium as recited in claim 8, further comprising deploying a single create command at the virtual hypervisor to create a plurality of virtual machines at different servers.

13. The computer readable storage medium as recited in claim 12, wherein the different servers are located at different data centers.

14. The computer readable storage medium as recited in claim 8, further comprising inputting the non-functional requirements as an input to the virtual hypervisor to address the non-functional requirements at the abstraction level.

15. A system for allocating resources in a cloud environment, comprising:

a cloud network managed by a cloud manager and configured to satisfy workload requests from at least one data center, the at least one data center including a resource manager configured to manage virtual machines; and at least one virtual hypervisor configured to provide an interface between the cloud manager and the at least one data center, the at least one virtual hypervisor being configured to address non-functional requirements of the workload at an abstraction level to reduce complexity of interactions between the cloud manager and the at least one data center.

16. The system as recited in claim 15, wherein the virtual hypervisor includes an application programming interface configured to manage resources and virtual machines by providing an interface between a cloud application programming interface and a resource pool manager of the at least one data center.

17. The system as recited in claim 15, further comprising physical hypervisors associated with physical servers in the at least one data center wherein the virtual hypervisor provides a user with application programming interfaces of the physical hypervisers.

18. The system as recited in claim 15, further comprising a single create command issued to the virtual hypervisor creates a plurality of virtual machines at different servers.

19. The system as recited in claim 18, wherein the different servers are located at different data centers.

20. The system as recited in claim 15, further comprising non-functional requirements received as an input to the virtual hypervisor to address the non-functional requirements at the abstraction level.

\* \* \* \* \*